3,109,031
ORGANOBORON POLYMERS AND PROCESS OF MAKING SAME

Herbert L. Goldstein, Suitland, Md., and Theodore L. Heying, North Haven, Conn., assignors to Olin Mathieson Chemical Corporation, a corporation of Virginia
No Drawing. Filed Apr. 5, 1962, Ser. No. 185,784
13 Claims. (Cl. 260—606.5)

This invention relates to novel organoboron polymers and to a method for their preparation. In particular, this invention relates to the preparation of polymers from vinylcarborane, methyl isopropenylcarborane or methyl vinylcarborane in the presence of phenyl lithium. The products of this invention are useful as fuels for solid propellants.

The carborane compounds useful as starting materials in the process of this invention, can be prepared as described in application Serial No. 813,032, filed May 13, 1959 of Ager, Heying and Mangold. For example, vinylcarborane, $B_{10}H_{10}CHCCH=CH_2$, can be prepared by reacting vinyl acetylene, decaborane, diethyl sulfide and benzene for about 8 hours at reflux temperature. Methyl isopropenylcarborane,

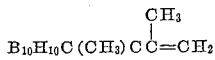

and methyl vinylcarborane, $B_{10}H_{10}C(CH_3)CCH=CH_2$, can be obtained in the same general manner. Hereinafter in the specification and claims the term vinylcarborane refers to the compound $B_{10}H_{10}CHCCH=CH_2$, the term methyl isopropenyl carborane refers to the compound

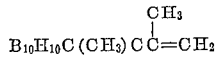

and the term methyl vinylcarborane refers to the term $B_{10}H_{10}C(CH_3)CCH=CH_2$.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with the present invention it has been found that vinylcarborane, methyl isopropenylcarborane or methyl vinylcarborane can be polymerized in a conventional bulk or solution polymerization process and in the presence of phenyl lithium to yield valuable organoboron polymers. When a solution polymerization system is employed, the carborane compound dissolved in a suitable solvent which can be, for example, a lower dialkyl ether is charged to the reactor and the solution brought to reflux by heating. To the refluxing solution the phenyl lithium is added and refluxing of the resulting mixture is continued for about 1 hour to about 20 hours or more. During the polymerization the free space in the reactor is continuously purged with nitrogen. At the conclusion of the polymerization reaction sufficient water is added to hydrolyze the reaction solution. The resulting organic layer is separated, dried over calcium chloride and following this the solvent is evaporated off leaving the crude polymer containing some unpolymerized carborane starting material. The polymer product can be recovered from the crude product in a variety of ways. For example, the unpolymerized carborane starting material can be removed from the crude product by sublimation under vacuum. The product resulting from the sublimation step is slurried in methanol, recovered from the slurry by filtration, and the methanol is evaporated off yielding the final polymer product. Alternatively, the unreacted carborane starting material can be extracted by boiling the crude product in a hydrocarbon solvent such as n-pentane. The final polymer product, which is recovered by filtration, is then dried to remove the solvent.

Organoboron polymers having molecular weights of from about 1000 to about 200,000 or more can be obtained by the process of this invention. Although the monomer concentration when a solvent is employed is not critical, it has been found preferable to employ a concentration of the starting carborane monomer of from about 5 to 65 percent by weight based on the weight of the solvent utilized. The reaction time can be varied widely from about 1 to about 20 hours or more with the preferred reaction time being from about 1 to about 10 hours.

In practicing the process of this invention it has been discovered that the highest degree of polymerization is achieved when freshly prepared phenyl lithium is used. In general, from about 0.2 to about 3.5 moles of phenyl lithium per mole of carborane monomer and preferably from about 0.5 to 1.25 moles of phenyl lithium per mole of carborane starting material will be utilized. The reaction temperature, in the case of a solution polymerization reaction can be varied widely from about 35° C. to about 200° C. and preferably from about 30° C. to about 140° C. When solution polymerization is employed, it is necessary to maintain the reaction mixture at reflux temperature in order to form the desired polymer. With bulk polymerization it is sufficient to merely heat the carborane compound in the presence of phenyl lithium to form the polymer. Temperatures from about 35° C. to about 200° C. and preferably from about 80° C. to about 145° C. can be used in carrying out the bulk polymerization process of this invention.

Suitable solvents for use in the solution-type polymerization reaction of this invention include the lower dialkyl ethers, such as ethyl ether, n-propyl ether, n-propyl butyl ether, isopropyl ether, methyl propyl ether, n-butyl ether, isobutyl ether, etc.; aliphatic hydrocarbon solvents such as n-pentane and hexane and aromatic hydrocarbon solvents such as benzene and toluene.

The physical properties of the polymers of this invention, especially the molecular weight and melting point are considerably affected by changing the reaction conditions. In general polymers which soften at room temperature to those having softening points above 250° C. can be produced by the process of this invention.

The process of this invention is illustrated in detail by the following examples which are to be considered not limitative.

EXAMPLE I

In this experiment a three-necked, round-bottom flask equipped with an addition funnel, a condenser fitted with a calcium chloride-filled drying tube through which nitrogen was introduced into the reaction flask during the entire experiment, and a thermometer was employed. Vinylcarborane in the amount of 0.025 mole dissolved in 35 ml. of diethyl ether was added to the flask and the solution was brought to reflux by heating. To the refluxing solution there was added dropwise 0.0275 mole of freshly prepared phenyl lithium and refluxing was continued for 4.5 hours at which time heating was terminated. Then approximately 50 ml. of water was added to the reaction mixture and the ether layer which resulted was removed by decantation. After the ether layer had been dried over calcium chloride for about 12 hours, the ether was removed by evaporation yielding a crude polymeric product containing some unpolymerized vinylcarborane. Extraction of the unpolymerized vinylcarborane was effected by boiling the crude product in n-pentane. The polymer product, polyvinylcarborane, was recovered by filtration from the pentane slurry and dried under vacuo.

The polyvinylcarborane product was analyzed and found to contain 58.2 (57.8) percent boron, 31.2 (30.3) percent carbon, and 8.71 (8.89) percent hydrogen. The molecular weight was determined and found to be 71,000 and the softening point was 270° C. A small portion of the polymer product was found to be insoluble in benzene and the molecular weight of this portion was determined to be 36,000. The total yield of polymer based on the vinylcarborane reacted was about 70 percent.

EXAMPLES II–X

A number of additional experiments were performed in which vinylcarborane was polymerized in the presence of phenyl lithium. Experimental details relating to these examples (II–X) is presented in Table 1.

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of par-

*Table 1*

| Example | Vinyl-carborane (moles) | Phenyl Lithium (moles) | Ethyl Ether (ml.) | Properties of Polymer Product |  |  |  |  | Total Yield of Polymer (percent) |
|---|---|---|---|---|---|---|---|---|---|
| | | | | Boron (percent) | Carbon (percent) | Hydrogen (percent) | Softening Point (° C.) | Molecular Weight[4] | |
| II | 0.025 | 0.0275 | 15 | 56.8 / 56.4 | 25.7 / 28.9 / 27.7 | 8.07 / 8.29 / 8.23 | >270 | 140,000 | 57 |
| III | 0.0234 | 0.0257 | 35 | 57.0 / 57.6 | 29.1 / 29.9 | 7.71 / 7.87 | 250 (sublimes at 200) | 62,000 | 39 |
| IV | 0.0234 | 0.257 | 0 | 57.8 / 57.1 | 26.7 / 26.7 | 8.00 / 7.64 | 230–240 (sublimes at 200) | 35,000 | 75 |
| V | 0.0234 | 0.257 | 35 | 60.6 / 60.7 | 29.7 / 27.0 | 7.85 / 7.93 | >300 | 42,000 | 27 |
| VI | 0.0234 | [2] 0.257 | | (¹) | (¹) | (¹) | 280 | 60,000 | 40 |
| VII | 0.0234 | 0.006 | 35 | (¹) | (¹) | (¹) | 94–97 | 110,000 | 10 |
| VIII | 0.0234 | 0.006 | 35 | (¹) | (¹) | (¹) | 180 | (¹) | (¹) |
| IX | 0.0295 | 0.0074 | 35 | (¹) | (¹) | (¹) | 250 | 50,000 | 5 |
| X | 0.0295 | 0.0295 | [3] 40 | 48.7 / 46.9 | 37.1 / 37.3 | 8.24 / 80.1 | 180–190 | (¹) | 50 |

[1] Not determined.
[2] Phenyl lithium employed was 5 days old.
[3] Solvent employed was pentane.
[4] Determined in benzene.

EXAMPLES XI–XIII

In these examples methyl vinylcarborane was polymerized in the presence of phenyl lithium in the same manner as described in Example I. Pertinent data relating to these experiments is described in Table 2 below:

*Table 2*

POLYMERIZATION OF METHYL VINYLCARBORANE IN THE PRESENCE OF PHENYL LITHIUM

| Example | Time (hours) | Molecular Weight of Polymer Product | Softening Point (° C.) |
|---|---|---|---|
| XI | 2 | 6,000 | 44–46 |
| XII | 4.5 | 36,000 | soft at room temperature |
| XIII | 8 | 3,400 | 65–69 |

EXAMPLE XIV

In this example methyl isopropenylcarborane was polymerized under conditions similar to those employed in Example I. A polymer softening at 40–50° C. and having a molecular weight of 13,000 was obtained.

tially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

What is claimed is:

1. A method for the preparation of an organoboron polymer which comprises polymerizing a compound selected from the group consisting of vinylcarborane, methyl isopropenylcarborane and methyl vinylcarborane in the presence of phenyl lithium.

2. The method of claim 1 in which the said compound is vinylcarborane.

3. The method of claim 1 in which the said compound is methyl isopropenylcarborane.

4. The method of claim 1 in which the said compound is methyl vinylcarborane.

5. A method for the preparation of an organoboron polymer which comprises polymerizing a compound selected from the group consisting of vinylcarborane, methyl isopropenylcarborane and methyl vinylcarborane, in the presence of phenyl lithium and in a solution polymerization system maintained at the boiling point under reflux at a temperature of from about 35° C. to about 200° C.

6. The method of claim 5 in which the said compound is vinylcarborane.

7. The method of claim 5 in which the said compound is methyl isopropenylcarborane.

8. The method of claim 5 in which the said compound is methyl vinylcarborane.

9. The method of claim 5 in which the solvent employed in the solution polymerization system is ethyl ether.

10. The method of claim 5 in which the solvent employed in the solution polymerization system is n-pentane.

11. A method for the preparation of an organoboron polymer which comprises polymerizing at a temperature of from about 35° C. to about 200° C. a compound selected from the group consisting of vinylcarborane, methyl isopropenylcarborane, and methyl vinylcarborane, in the presence of phenyl lithium and in a bulk polymerization system.

12. The method of claim 11 in which the said compound is vinylcarborane.

13. The product produced by the method of claim 1.

No references cited.